US010754929B2

(12) United States Patent
Adams et al.

(10) Patent No.: US 10,754,929 B2
(45) Date of Patent: Aug. 25, 2020

(54) SHARING CONTENTS BETWEEN APPLICATIONS

(71) Applicant: BlackBerry Limited, Waterloo (CA)

(72) Inventors: Neil Patrick Adams, Waterloo (CA); Jeremy Lawson Kominar, Waterloo (CA); Joseph Patrick Kirwin, Vancouver (CA); Glenn Daniel Wurster, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 225 days.

(21) Appl. No.: 15/048,489

(22) Filed: Feb. 19, 2016

(65) Prior Publication Data
US 2017/0242983 A1 Aug. 24, 2017

(51) Int. Cl.
*G06F 21/00* (2013.01)
*H04L 9/30* (2006.01)
*G06F 21/31* (2013.01)
*G06F 21/10* (2013.01)
*G06F 21/62* (2013.01)
*G06F 9/54* (2006.01)

(52) U.S. Cl.
CPC .............. *G06F 21/10* (2013.01); *G06F 9/543* (2013.01); *G06F 21/6209* (2013.01); *H04L 9/30* (2013.01); *G06F 21/31* (2013.01); *G06F 2221/0737* (2013.01); *G06F 2221/2141* (2013.01)

(58) Field of Classification Search
CPC .. G06F 21/10; G06F 21/31; G06F 2221/0737; H04L 9/30
See application file for complete search history.

(56) References Cited

U.S. PATENT DOCUMENTS

| | | | |
|---|---|---|---|
| 9,129,095 B1* | 9/2015 | Lam | G06F 21/6218 |
| 9,177,175 B2* | 11/2015 | Margolus | G06F 21/6272 |
| 9,183,380 B2* | 11/2015 | Qureshi | G06F 21/53 |
| 9,235,717 B1 | 1/2016 | Kim et al. | |
| 9,405,887 B2* | 8/2016 | Yin | G06F 21/10 |
| 9,514,333 B1* | 12/2016 | Patel | G06F 21/6245 |

(Continued)

OTHER PUBLICATIONS

Extended European Search Report issued in European Application No. 17151359.1 dated Jul. 26, 2017; 8 pages.

(Continued)

*Primary Examiner* — Yonas A Bayou
(74) *Attorney, Agent, or Firm* — Fish & Richardson P.C.

(57) ABSTRACT

Systems, methods, and software can be used to share content. In some aspect, a first user input for copying a content is received at a first application on a mobile device. A token that is associated with the content is generated. A Uniform Resource Identifier (URI) is sent from the first application to a clipboard application. A second user input for pasting the content is received at a second application on the mobile device. The token is received at the second application from the clipboard application. A request for the content is received from the second application. The request includes the token. Whether the second application is authorized to receive the content is determined at the first application. In response to determining that the second application is authorized to receive the content, the content is provided to the second application.

17 Claims, 16 Drawing Sheets

(56) References Cited

U.S. PATENT DOCUMENTS

| | | | |
|---|---|---|---|
| 2006/0048224 A1* | 3/2006 | Duncan | G06F 21/6218 726/22 |
| 2009/0165080 A1* | 6/2009 | Fahn | G06F 21/10 726/1 |
| 2012/0144195 A1* | 6/2012 | Nair | H04N 7/1675 713/168 |
| 2013/0111207 A1* | 5/2013 | von Behren | H04L 9/0897 713/164 |
| 2013/0145455 A1* | 6/2013 | Vijayshankar | G06F 21/78 726/16 |
| 2013/0232553 A1* | 9/2013 | Tomfohrde | G06F 21/10 726/4 |
| 2014/0181518 A1* | 6/2014 | Kim | H04L 9/08 713/168 |
| 2014/0267339 A1 | 9/2014 | Dowd et al. | |
| 2015/0249617 A1* | 9/2015 | Chang | H04L 67/04 709/225 |

OTHER PUBLICATIONS

Communication Under Rule 71(3) EPC issued in European Application No. 17151359.1 dated Dec. 18, 2018, 7 pages.

\* cited by examiner

SHARING CONTENTS BETWEEN APPLICATIONS

BACKGROUND

The present disclosure relates to sharing content on a device. Many electronic devices, including mobile devices, or other computer systems, enable a user to share content across different applications. For example, content can be cut or copied in one application and pasted in a different application.

DESCRIPTION OF DRAWINGS

Like reference numbers and designations in the various drawings indicate like elements.

DETAILED DESCRIPTION

In some cases, a clipboard application can be used to implement content sharing between applications. For example, when content is cut or copied in a provider application, the content can be exported to a clipboard. When a pasting function is executed in a recipient application, the recipient application can retrieve the content from the clipboard application. Examples of the content can include text, picture, video, audio, or any other contents. In some cases, the clipboard application can be a global application, or an extension in an operating system of the electronic device. In these cases, any applications on the electronic device can access the clipboard application.

In some cases, an application that is different than the provider application or the recipient application can access the clipboard application. The application can retrieve, add, or change the content on the clipboard application. In some cases, a user may not be aware that the content in the clipboard application has been accessed. Therefore, sharing content through the clipboard application may present security issues. The severity of the security issues can increase if the content includes sensitive information, e.g., username or password or both.

In some cases, content can be shared securely between applications, using tokens. For example, when a copying function is executed in a provider application, a token associated with the content can be generated. The token can be associated with one or more applications that are authorized to receive the content. The token can be exported to the clipboard application and retrieved by the recipient application. The recipient can send the token to the provider application for the content. The provider application can verify whether the recipient application is authorized before providing the content to the recipient application. FIGS. 1-16 and associated descriptions provide additional details of these implementations.

Figure 1:
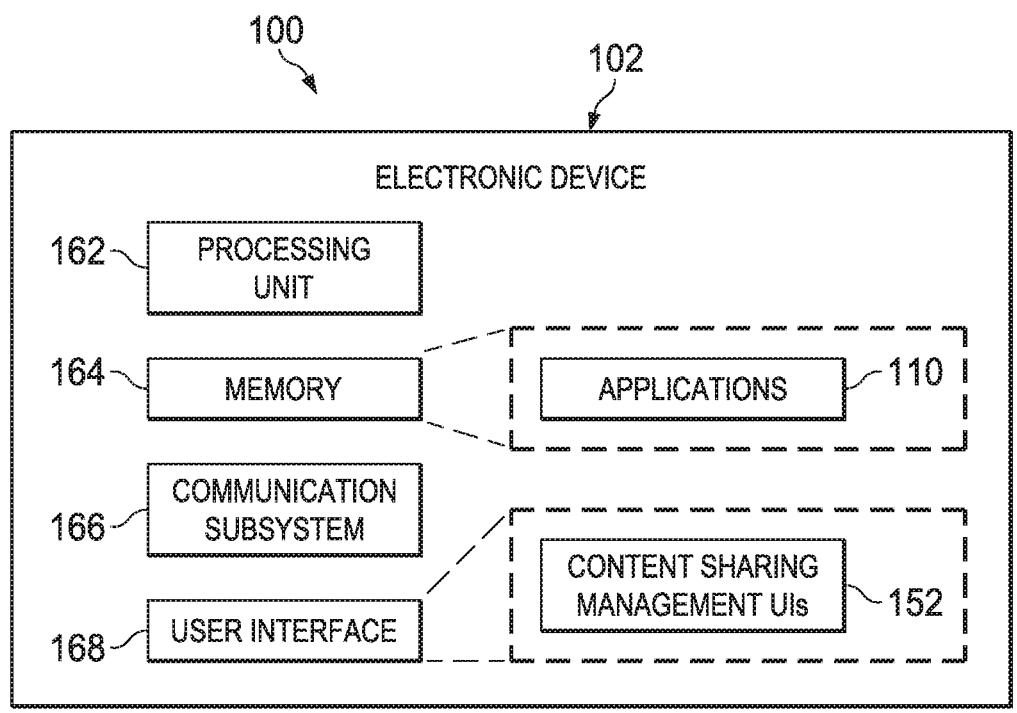
FIG. 1 is a schematic diagram showing an example of sharing content in an example electronic device.

FIG. 1 is a schematic diagram 100 showing an example of sharing content in an example electronic device 102. The electronic device 102 includes a processing unit 162, a communication subsystem 166, a user interface 168, and a memory 164. An electronic device may include additional, different, or fewer features, as appropriate.

The example processing unit 162 can include one or more processing components (alternatively referred to as "processors" or "central processing units" (CPUs)) configured to execute instructions related to one or more of the processes, steps, or actions described above in connection with one or more of the implementations disclosed herein. In some implementations, the processing unit 162 can be configured to generate control information, such as a measurement report, or respond to received information, such as control information from a network node. In some cases, the processing unit 162 can also be configured to make a radio resource management (RRM) decision, such as cell selection/reselection information or trigger a measurement report. The processing unit 162 can also include other auxiliary components, such as random access memory (RAM) and read-only memory (ROM).

The example communication subsystem 166 can be configured to provide wireless or wireline communication for data or control information provided by the processing unit 162. The communication subsystem 166 can include, for example, one or more antennas, a receiver, a transmitter, a local oscillator, a mixer, and a digital signal processing (DSP) unit. In some implementations, the communication subsystem 166 can support multiple input multiple output (MIMO) transmissions. In some implementations, the receivers in the communication subsystem 166 can be an advanced receiver or a baseline receiver. Two receivers can be implemented with identical, similar, or different receiver processing algorithms. In some cases, the method described herein can be implemented in an electronic device that does not include a communication subsystem.

The example user interface 168 can include, for example, any of the following: one or more of a display or touch screen display (for example, a liquid crystal display (LCD), a light emitting display (LED), an organic light emitting display (OLED), or a micro-electromechanical system (MEMS) display), a keyboard or keypad, a trackball, a speaker, or a microphone. As shown in FIG. 1, the example user interface 168 can be configured to output one or more content sharing management user interfaces 152. The content sharing management user interfaces 152 can include user interfaces that enable the user to configure content sharing features for one or more applications. FIGS. 3-16 and associated descriptions provide additional details of these implementations.

The example memory 164 can be a computer-readable storage medium on the electronic device 102. Examples of the memory 164 include volatile and non-volatile memory, magnetic media, optical media, random access memory (RAM), read-only memory (ROM), removable media, and others. The memory 164 can store an operating system (OS) of electronic device 102 and various other computer-executable software programs for performing one or more of the processes, steps, or actions described above.

As shown in FIG. 1, the example memory 164 can include one or more applications 110. The applications 110 can be represent an application, set of applications, software, software modules, hardware, or combination thereof that can be configured to execute secure content sharing operations. For example, the applications 110 can include a provider application, where a cutting or copying function is executed to securely copy a content. The applications 110 can also include a recipient application, where a pasting function is executed to securely paste the copied content. Examples of the content for content sharing operations include text, picture, audio, video, or any other content. For example, the content can include a username, a password, or a combination thereof. FIGS. 3-16 and associated descriptions provide additional details of these implementations.

Turning to a general description, a mobile device, e.g., the electronic device 102, may be referred to as mobile electronic device, user device, mobile station, subscriber station, portable electronic device, mobile communications device, wireless modem, or wireless terminal. Examples of an electronic device (e.g., the electronic device 102) may include a cellular phone, personal data assistant (PDA), smart phone, laptop, personal computer (PC), tablet, pager, portable computer, portable gaming device, wearable electronic device, desktop computer, or other communication devices having components for communicating via a wireless or a wireline communication network.

Figure 2:
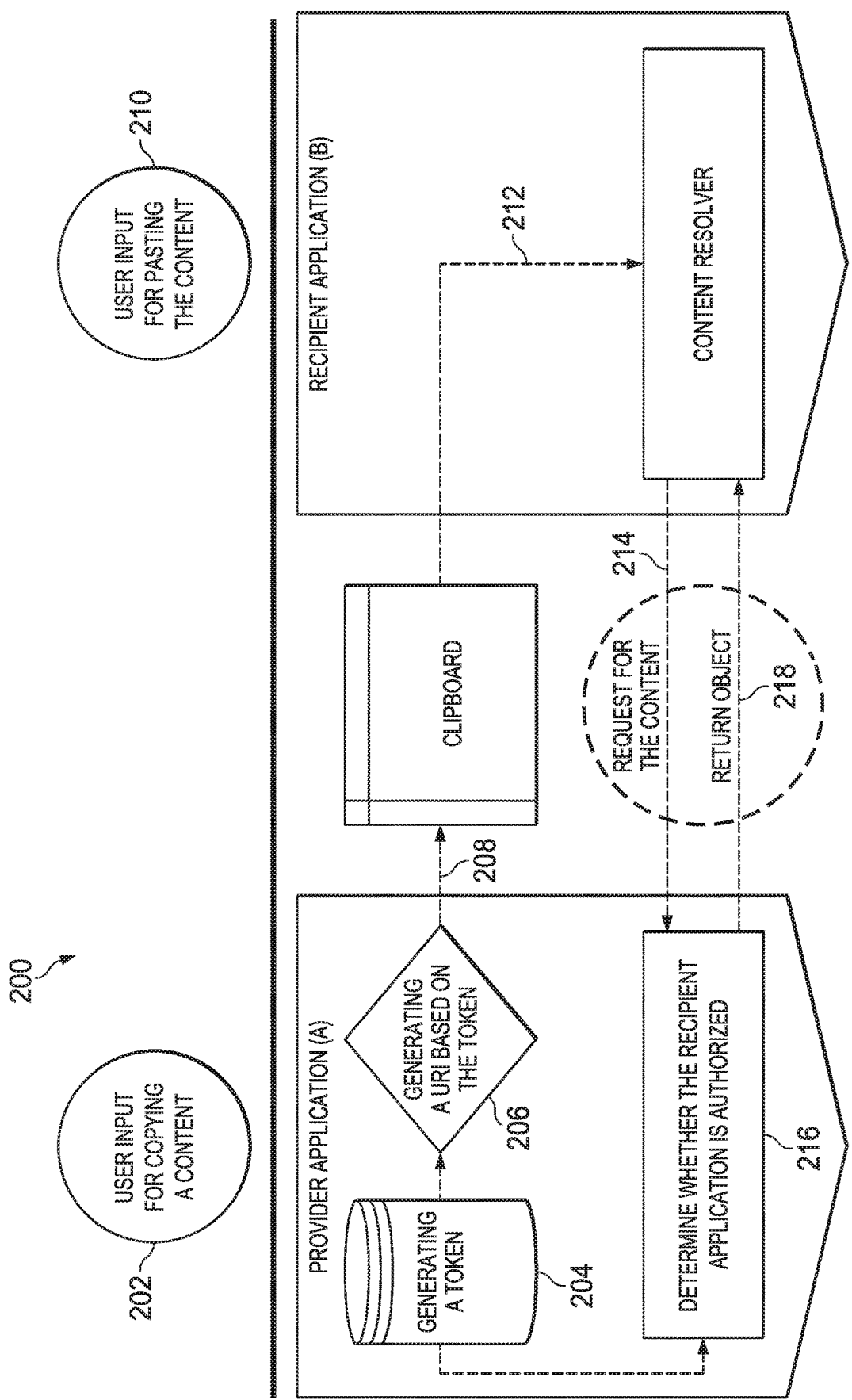
FIG. 2 is a flow diagram showing an example process for sharing content.

FIG. 2 is a flow diagram showing an example process 200 for sharing contents.

The process 200 can be implemented by an electronic device, e.g., a mobile device. The example process 200 shown in FIG. 2 can also be implemented using additional, fewer, or different operations, which can be performed in the order shown or in a different order.

The example process 200 begins at 202, where the mobile device receives a user input for cutting or copying content at a provider application. For example, a user may highlight the content and execute a cutting or copying function. In some cases, the cutting or copying function can be executed by a voice command, key press, touch, click, swipe, or any other gesture or input that is associated with a cutting or copying function. Alternatively, the mobile device can receive a user input for cutting a content at a provider application.

At 204, a token is generated. In some cases, the token can be an identity number that identifies the content. In some cases, the token can also be associated with additional information for the content. For example, the token can be associated with the content data. In some cases, Multipurpose Internet Mail Extensions (MIME) can be used to identify the content type. Examples of the content can be text, picture, video, audio, or any other content; accordingly, different MIME types can be used to identify the content type.

The token can also be associated with a list of authorized applications. The list can include the application identifiers of one or more applications that are authorized to receive the copied or cut content from the provider applications. In some cases, the token and the associated information can be stored in a token cache. The token cache can be accessed by the provider application for retrieval and management of the tokens. In some cases, the token and the associated information can be stored in a tuple format, e.g., tuple <token, data, authorized application list>.

At 206, a token Uniform Resource Identifier (URI) can be generated. The token URI can include the token generated at 204. The URI can also include the name or the identifier of the provider application. Below is an example of the token URI: content://com.mycomp.applicationA/token/2BA1234F, where applicationA is the provider application and 2BA1234F is the token. In some cases, the URI can include the type of the content, e.g., the MIME_TYPE of the content data.

At 208, the token URI is exported to the clipboard application. In some cases, the provider application can access a content provider extension provided by the operating system to export the token URI to the clipboard application.

At 210, a user input for a pasting the content is received from a recipient application. For example, a pasting function may be executed inside an application that is different than the provider application. In some cases, the pasting function can be executed by a click, a swipe, or any other gesture or command that is associated with a pasting function.

At 212, the recipient application can retrieve the token URI. In some cases, the recipient application can access a content resolver extension provided by the operating system to retrieve the token URI. The recipient application can identify the token from the token URI.

At 214, the recipient application initiates a request for the content. The request can include the token. In some cases, the request can be sent to the content resolver extension in a function call to the provider application's content provider extension.

At 216, the provider application determines whether the recipient application is authorized to receive the content. In some cases, the provider application determines whether the recipient application is authorized by checking whether the application identifier of the recipient application is included in the authorized application list associated with the token. In some cases, the provider application can determine the application identifier of the recipient application using a binder function call. In some cases, the binder function call can access a package manager provided by the operating system and return the application identifier of the recipient application. In some cases, the determination of whether the recipient application is authorized to receive the content can be executed by the content provider extension.

In some cases, the provider application can manage the life cycle of the token. In some cases, the provider application can invalidate a token so that the token cannot be used to retrieve the content associated with the token. In one example, the provider application can invalidate the token after a configured period of time has passed, after the generation of the token. In another example, the token can be invalidated after a configured period of time has passed since a first request for the content has been received. Alternatively or additionally, the provider application can keep track of the recipient applications that request the content. If all the authorized applications have requested the content, the provider application can determine that the content is no longer needed and therefore can invalidate the token. In some cases, a number of paste operations can be configured for the content. Alternatively or additionally, the provider application can keep track of the number of requests received for the content, the token can be invalidated if the number of requests exceeds a configured number. In some cases, the provider application can manage the life cycle of the token using the content provider extension.

At 218, a return object is sent to the recipient application. If the recipient application is determined to be authorized, the return object can include a cursor object that points to the content data. The recipient application can, e.g., through the content resolver extension, retrieve the content data. In some cases, the content data can be retrieved using a query function call with the cursor object. If the recipient application is determined to be not authorized, the return object can include a null object.

Figure 3:
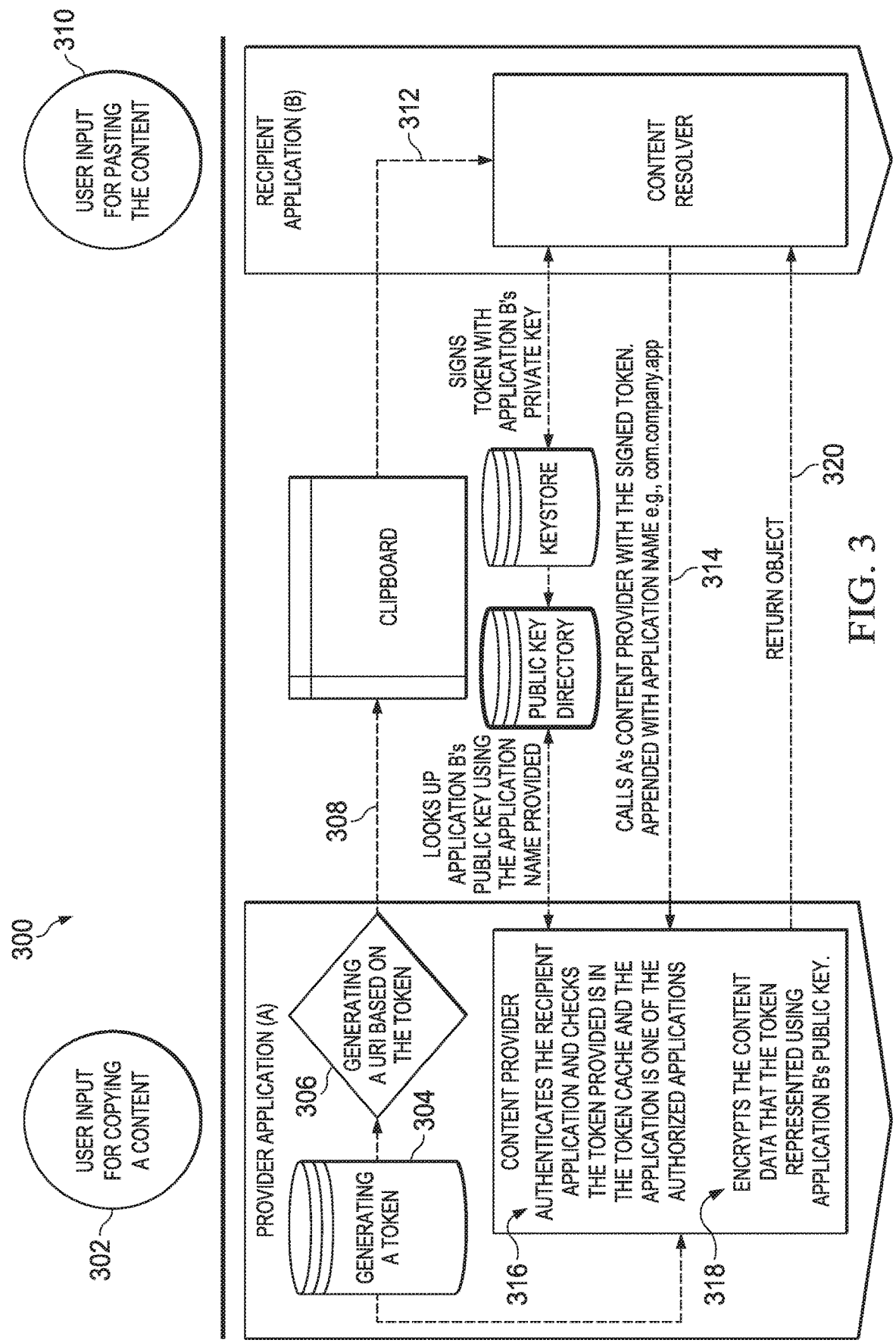
FIG. 3 is a flow diagram showing another example process for sharing content.

In some cases, the token in the request for content can be authenticated to provide additional security. FIG. 3 is a flow diagram showing another example process 300 for sharing contents. The process 300 can be implemented by an electronic device, e.g., a mobile device. The example process 300 shown in FIG. 3 can also be implemented using additional, fewer, or different operations, which can be performed in the order shown or in a different order.

The example process 300 begins at 302, where the mobile device receives a user input for copying a content at a provider application. Alternatively, the mobile device can receive a user input for cutting content at a provider application. At 304, a token is generated. The token can include an identity number, the content data, a list of authorized applications, or a combination thereof. At 306, a token URI is generated. The token URI can include the token, the name or the identifier of the provider application, the type of the content data, or a combination thereof. At 308, the token URI is exported to the clipboard application. At 310, a user input for pasting the content is received from a recipient application. At 312, the recipient application can retrieve the token URI.

At 314, the recipient application sends a request for the content. In some cases, the request can include a signed token. In some cases, the token can be signed with the private key of the recipient application. In some cases, the recipient application can access the keystore of the operating system to retrieve the private key and signs the token with the private key. In some cases, the recipient application may share keys with one or more applications having the same common management scheme. For example, the recipient application may be an enterprise application for an enterprise. In this example, the private key for the enterprise can be used to sign the token. In some cases, the request also includes the name of the recipient application. Examples of the operating systems include ANDROID, IOS, QNX, LINUX, UNIX, WINDOWS, MAC OS or any other suitable operating system.

At 316, the provider application authenticates the recipient application. In some cases, the provider application can look up the recipient application's public key using the name of the recipient application that is included in the request. For example, the provider application can access the public key directory, which obtains the public key of the recipient application from the keystore. The provider application can use the public key of the recipient application to decrypt the signed token and determine whether the decrypted token matches a token in the token cache. If decrypted token does not match any token in the token cache, then the request may be sent by a rogue application pretending to be the recipient application, and the authentication fails. In some cases, if the authentication fails, a null object will be returned in response to the request for content.

If the authentication succeeds, the provider application proceeds to determine whether the recipient application is included in the list of authorized applications. If the recipient application is authorized, a cursor object pointing to the content data may be returned. Otherwise, a null object may be returned.

In some cases, the content data can be encrypted. For example, at 318, the content data can be encrypted using the recipient application's public key. This approach may provide additional security against eavesdropping on the query function call.

At 320, a return object is sent to the recipient function. As discussed above, the return object may be a cursor object pointing to the content data or a null object.

Figure 4:
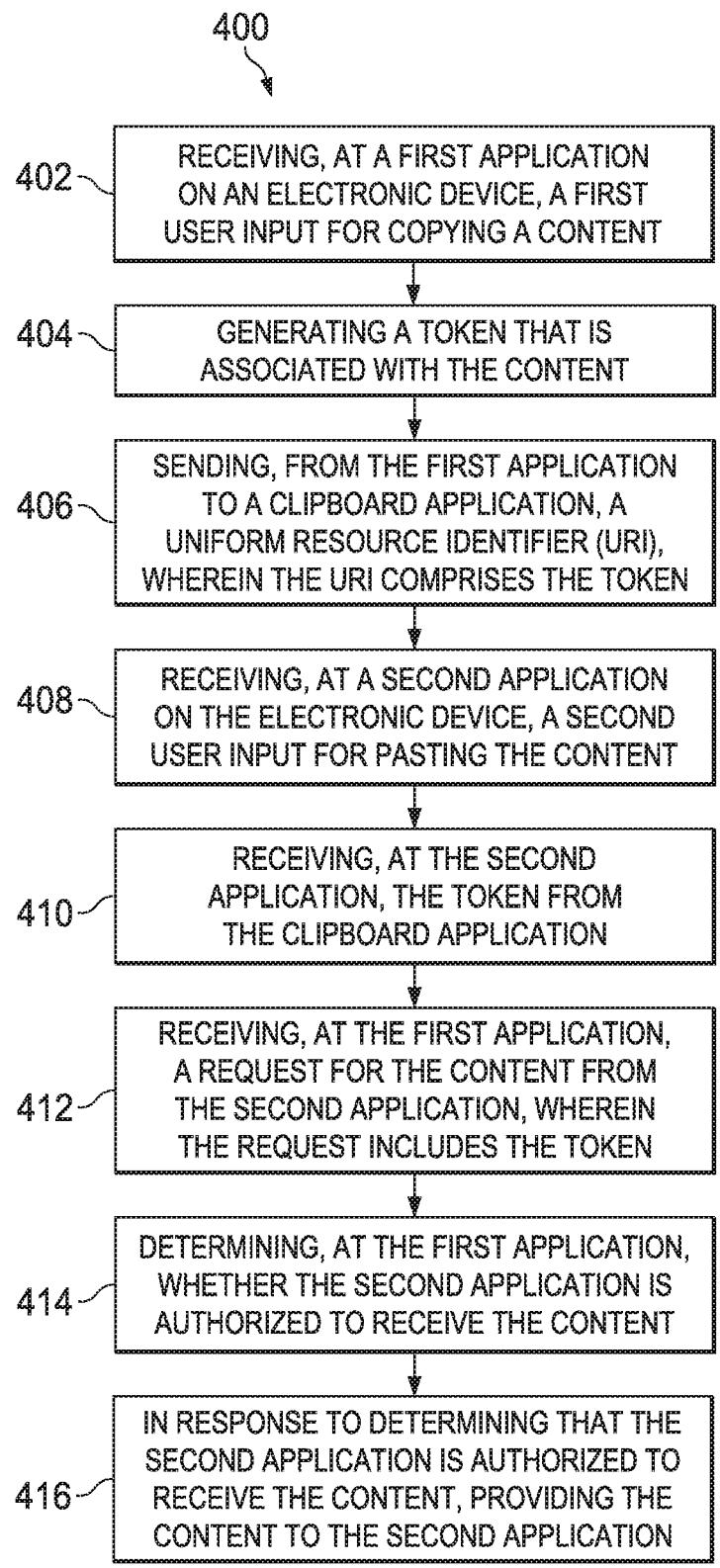
FIG. 4 is a flowchart showing an example method for sharing content.

FIG. 4 is a flowchart showing an example method 400 for sharing contents. The method 400 can be implemented by an electronic device, e.g., a mobile device. The example method 400 shown in FIG. 4 can also be implemented using additional, fewer, or different operations, which can be performed in the order shown or in a different order.

The example method 400 begins at 402, where a first user input for copying a content is received at a first application on a mobile device. At 404, a token that is associated with the content is generated. At 406, a Uniform Resource Identifier (URI) is sent from the first application to a clipboard application. The URI includes the token. At 408, a second user input for pasting the content is received at a second application on the mobile device. At 410, the token is received at the second application from the clipboard application. At 412, a request for the content is received from the second application. The request includes the token. At 414, whether the second application is authorized to receive the content is determined at the first application. At 416, in response to determining that the second application is authorized to receive the content, the content is provided to the second application.

Figure 5:
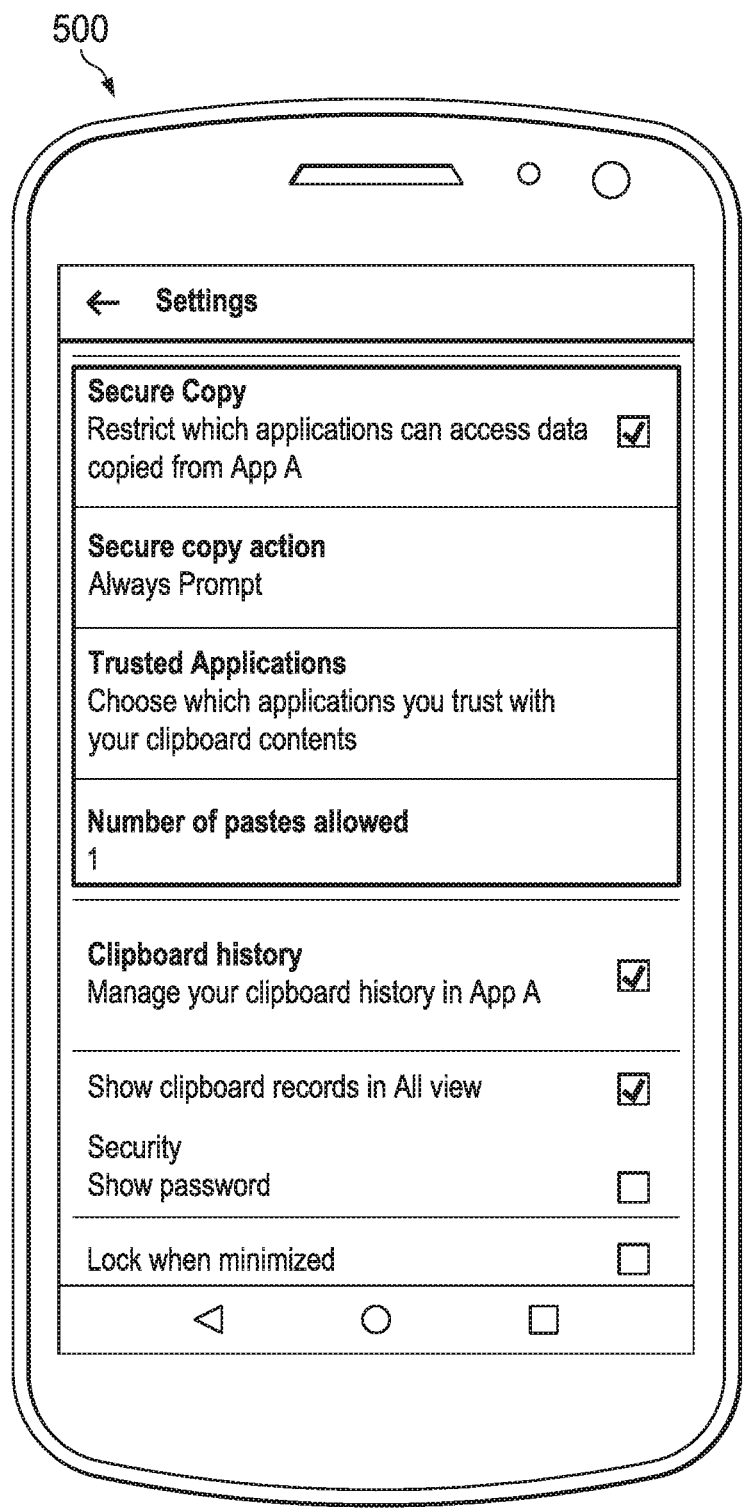
FIG. 5 shows an example graphic user interface for configuring a secure copying feature.

In some cases, a user can configure the security features for sharing contents across applications. FIG. 5 shows an example graphic user interface 500 for configuring a secure copying feature. As shown in FIG. 5, a user can select the box of "secure copy" to turn on the secure content sharing method described previously. In some cases, the user can set the configurations of the "secure copy" feature for one individual application, e.g., app A as shown in FIG. 5. In some cases, the user can set the configurations of the "secure copy" feature for a collection of applications, e.g., the applications having the same management scheme. In some cases, the user can set the configurations of the "secure copy" feature for the mobile device so that all the applications on the mobile device can use the same "secure copy" feature.

As shown in FIG. 5, a user or administrator can also configure whether the "secure copy" action is prompt. If the action is configured to be "always prompted," then when a user input for copying a content is received, a user interface object can be presented to ask the user to select whether the "secure copy" feature is executed for the current copying function. The action can also be configured to be "not prompted," and then the "secure copy" feature is executed without a prompt. The list of the authorized applications and number of pastes is also configurable. As discussed previously, if a number of pastes is configured, then the provider application can invalidate the token once the number of requests for the content has been reached.

Figure 6:
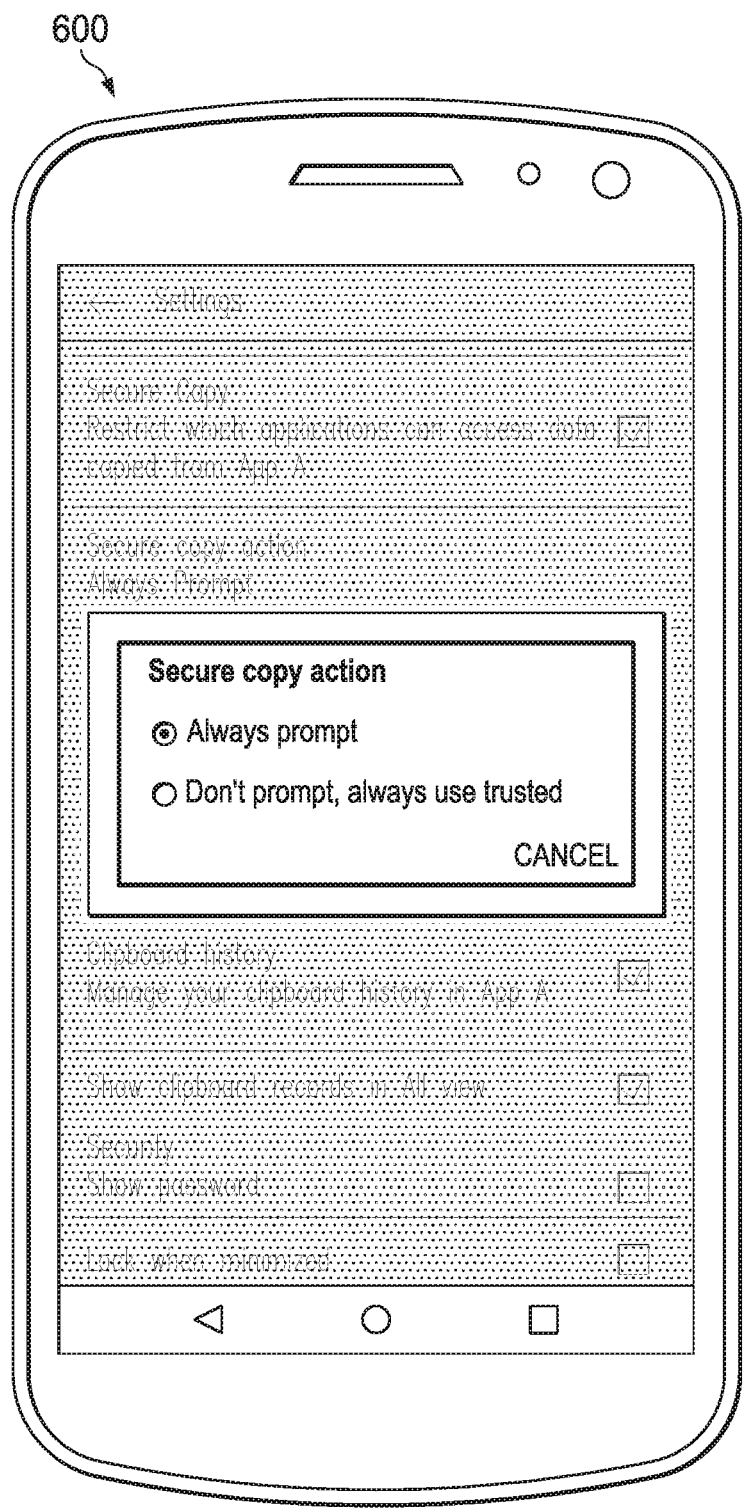
FIG. 6 shows an example graphic user interface for choosing configuration options for authorized applications.

FIG. 6 shows an example graphic user interface 600 for choosing configuration options for the authorized applications. In some cases, the user can select whether to pre-configure a list of authorized applications, or to prompt the user to select the authorized applications when the user executes a copying function. If the user selects to pre-configure a list of authorized applications, a list of authorized applications can be stored in the provider application before the user executes a copying function. When a token is generated in response to a user input for copying a content, the stored list can be associated with the token. This approach reduces user inputs during a copying function and speeds up the secure copy operation.

If the user selects to prompt for the authorized applications, then when a user executes a copying function, a user interface can be presented for the user to select the authorized applications. This approach enables the user to select different authorized applications depending on the particular content for copying.

Figure 7:
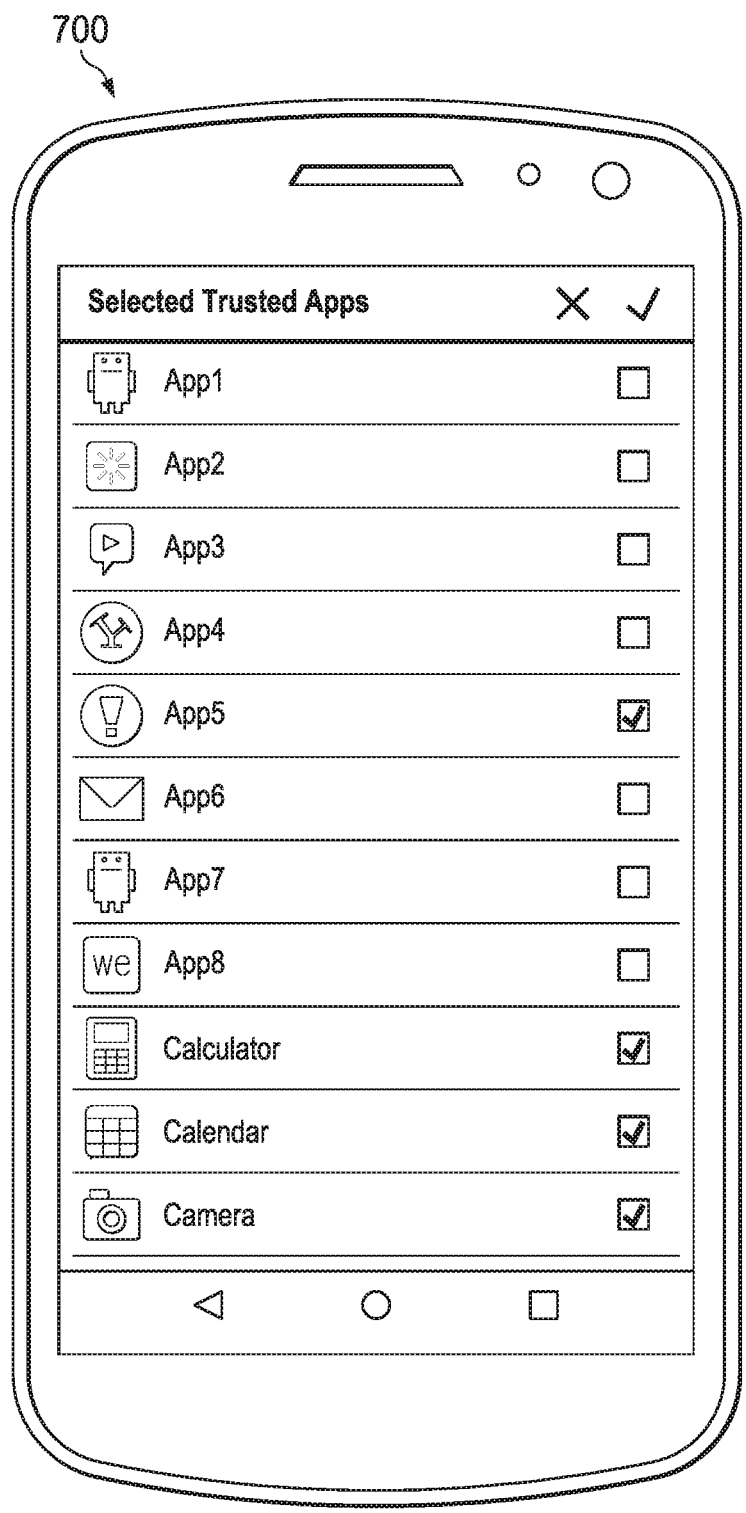
FIG. 7 shows an example graphic user interface for configuring authorized applications.

FIG. 7 shows an example graphic user interface 700 for configuring the authorized applications. The example graphic user interface 700 can be presented when the user or administrator configures the "secure copy" feature, or when a copying function is executed, or a combination thereof. As shown in FIG. 7, applications can be selected or unselected from a list of applications to be authorized or unauthorized to receive the copied content.

Figure 8:
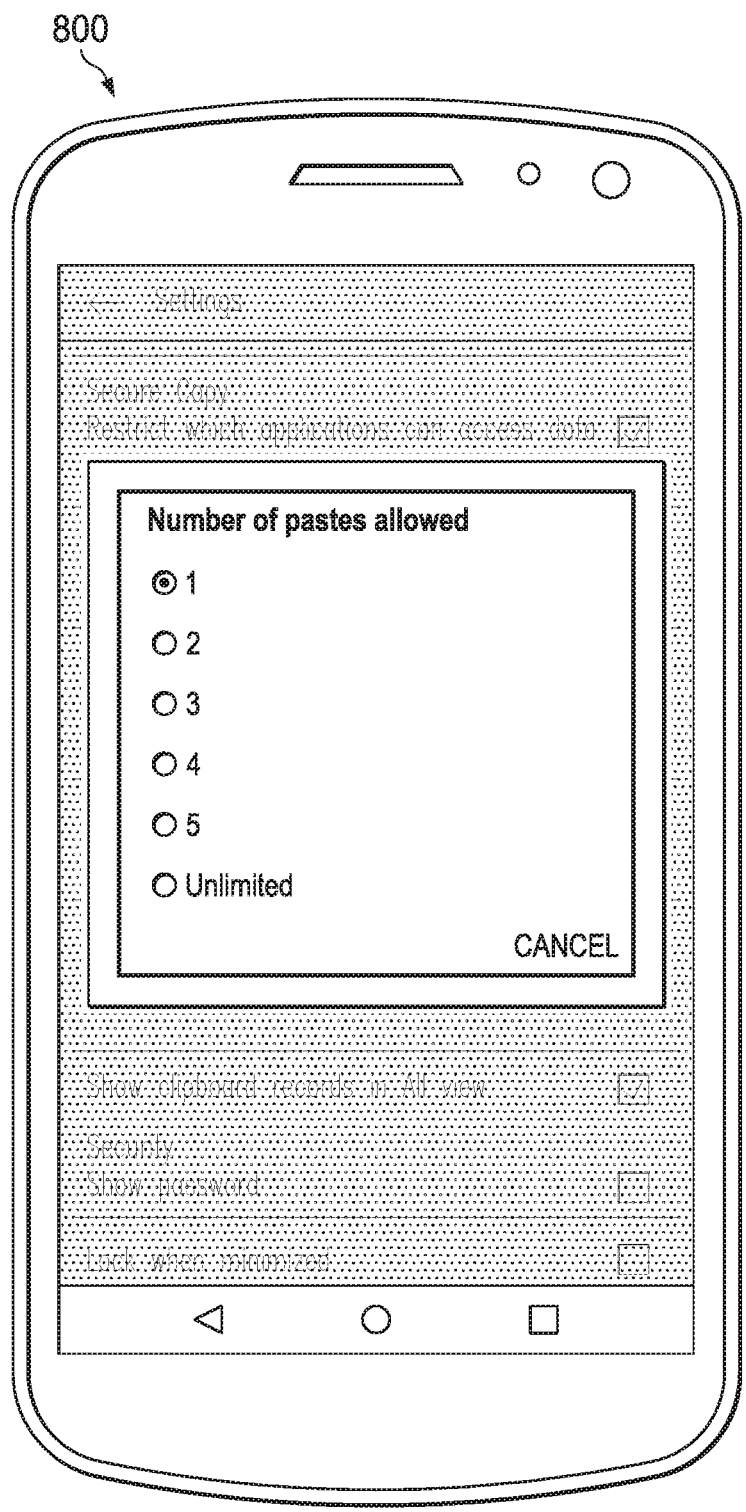
FIG. 8 shows an example graphic user interface for configuring the number of pasting functions.
Figure 16:
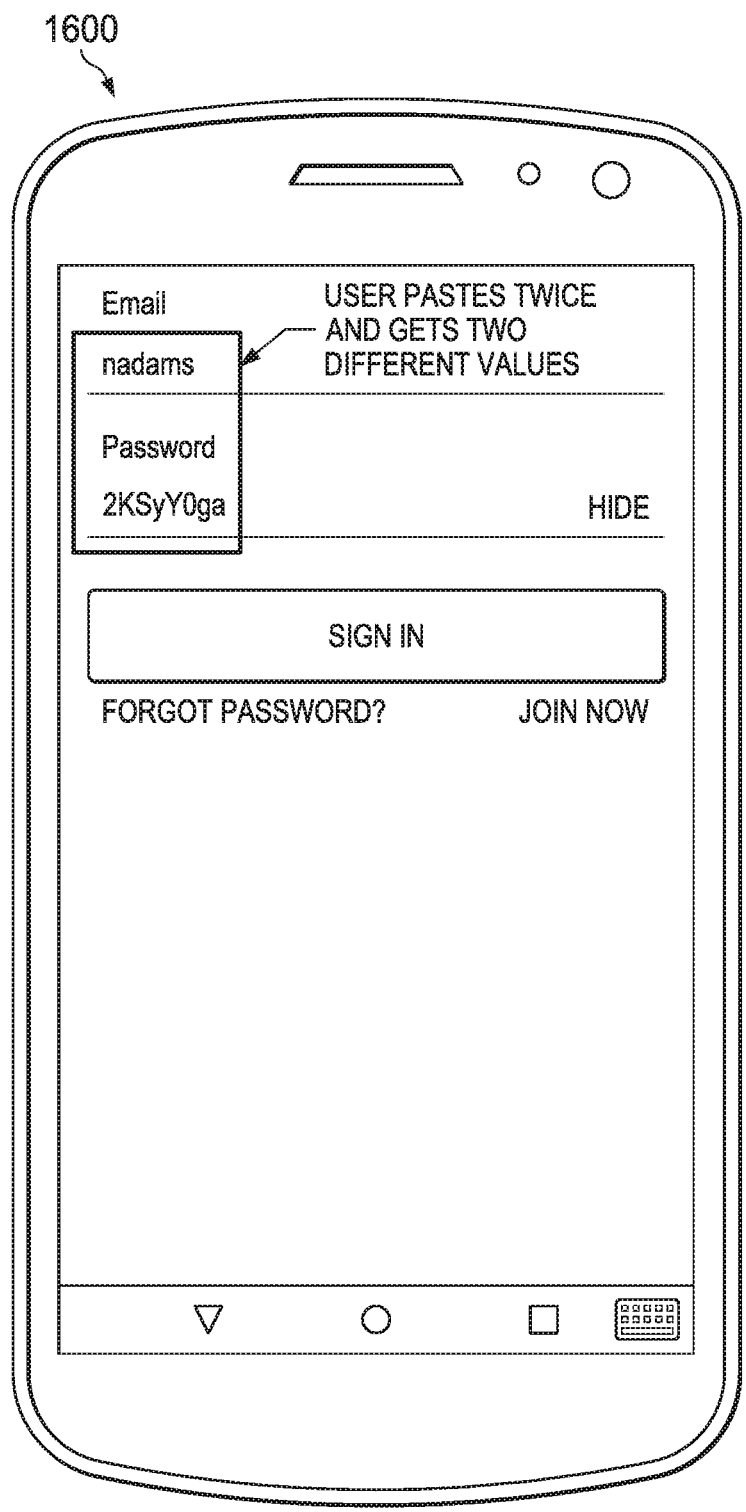
FIG. 16 shows an example graphic user interface for pasting a username and a password.

FIG. 8 shows an example graphic user interface 800 for configuring the number of pasting functions. As shown in FIG. 8, the user or administrator can select 1, 2, 3, 4, 5, or unlimited. If the user selects "unlimited," the provider application may not invalidate the token in response to reaching a threshold number of pasting requests. Alternatively or in combination, the user can select a valid duration for the token. For example, the user can select or set a valid duration between the content is copied and the content is pasted. If a pasting function is executed after the valid duration has lapsed, the token may be invalidated. In another example, the user can configure a duration between the first and the second pasting functions. If the second pasting function is executed before the configured duration has lapsed, a second portion of the content can be pasted in response to the second pasting function. If the second pasting function is executed after the configured duration has lapsed, the first portion of the content can be pasted in response to the second pasting function. FIG. 16 and associated descriptions provide additional details of these implementations. In some cases, the number of pasting functions or the valid duration described above can be determined using a heuristic approach and without user interaction. For example, the average duration or the maximum duration between copying a content and pasting the content for a particular application can be recorded. A valid duration for copying and pasting the content associated with the particular application can be determined based on the historical records of the average duration, the maximum duration, or a combination thereof. Similarly, a threshold number of pasting functions allowed for a content in a particular application can be determined based on the historical records of the number of pasting functions associated with that particular function.

Some methods do not involve the user, including computing the time based on an analysis of application behavior or some similar approach. Such a heuristic approach is likely well suited for the time based limits, and may improve usability on the count based approach as well.

Figure 9:
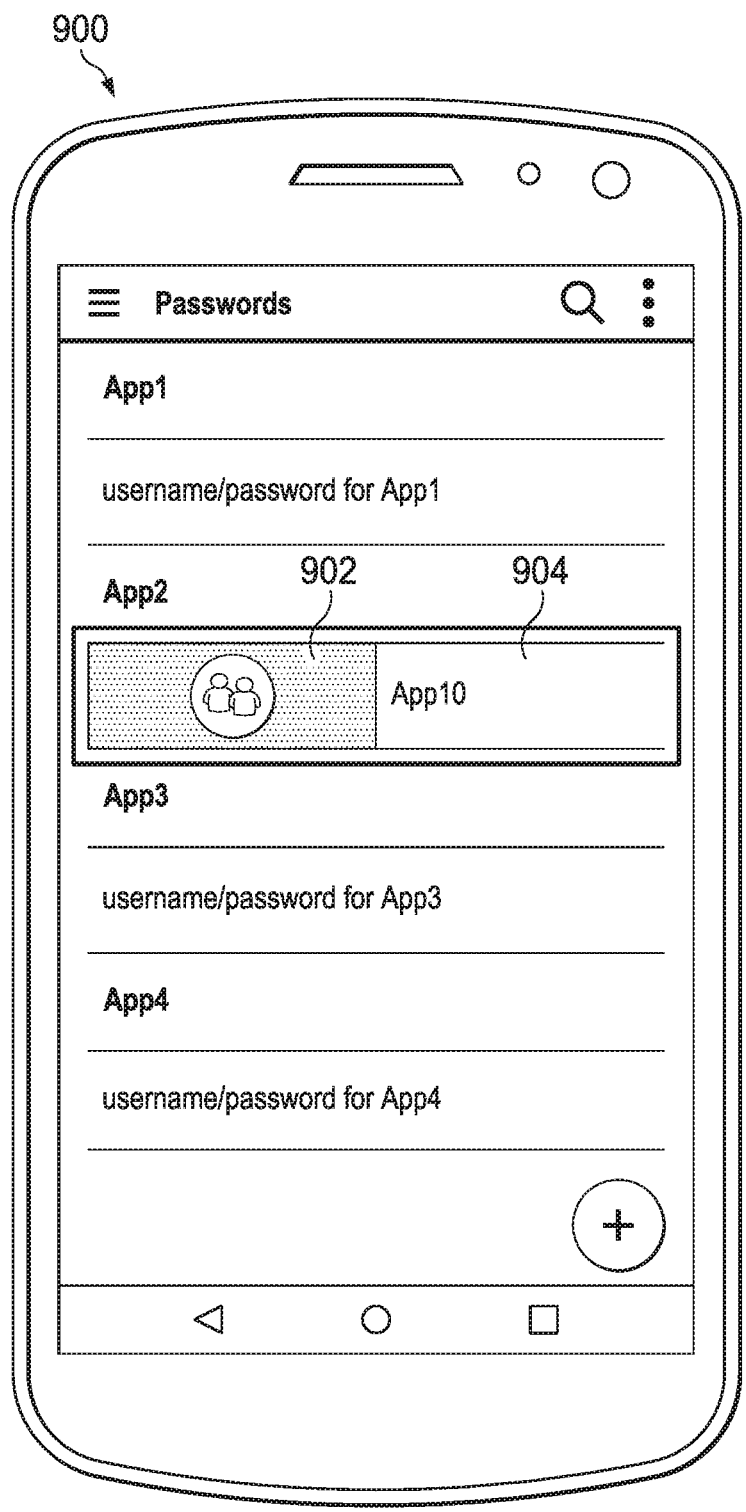
FIG. 9 shows an example graphic user interface for copying content.

In some cases, a user can execute one user interface function to copy multiple portions of content. For example, a user can use one gesture to copy the information in a username field and the information in a password field. FIG. 9 shows an example graphic user interface 900 for copying content. The graphic user interface 900 includes a user interface for stored usernames and passwords for different applications. For example, the graphic user interface 900 includes a username 902 for app2 and a password 904 for app2. A user can copy the username 902, the password 904, or a combination thereof by a click, a swipe, or other user gestures for a copying function.

Figure 10:
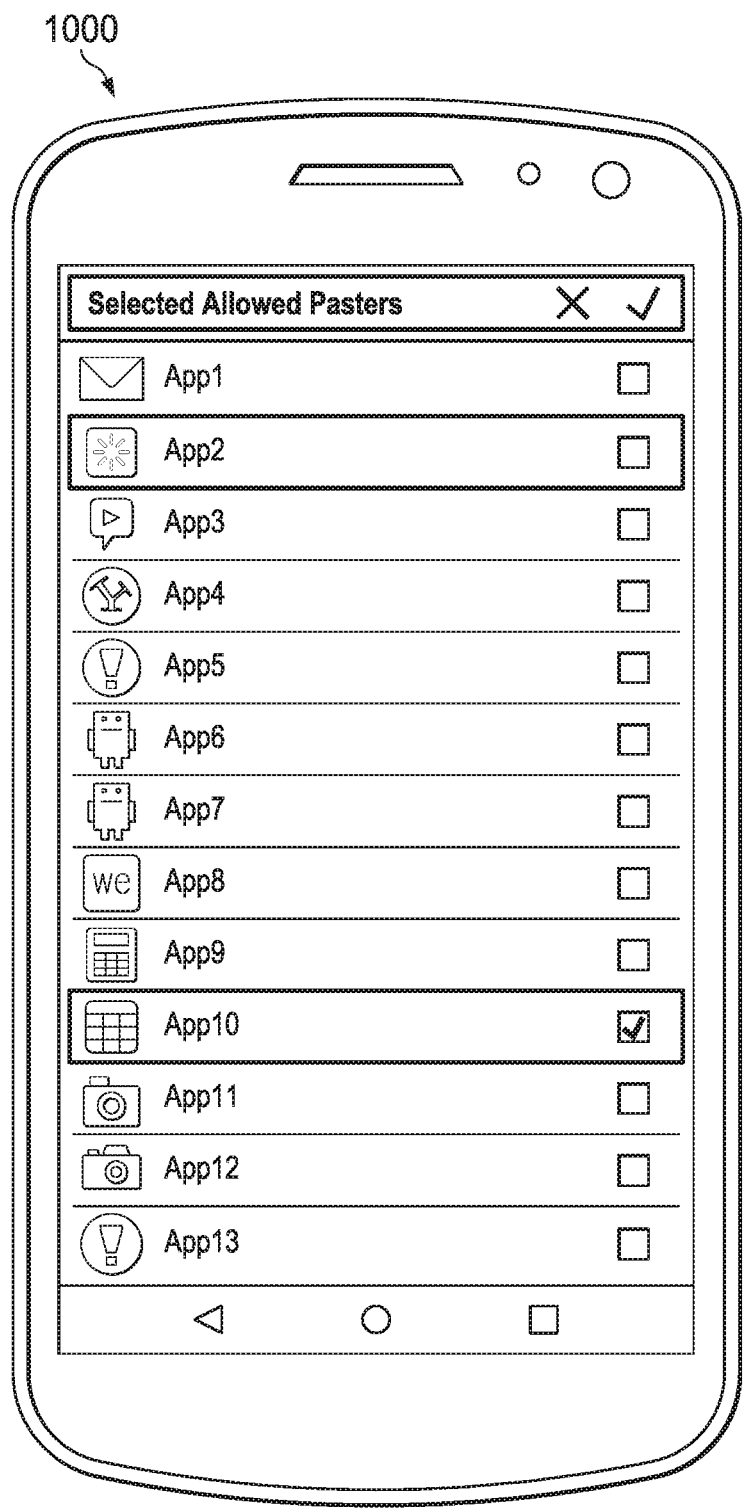
FIG. 10 shows an example graphic user interface for selecting authorized application to paste content.

FIG. 10 shows an example graphic user interface 1000 for selecting an authorized application to paste the content that is copied in FIG. 9. As shown in FIG. 10, a user or administrator can select app10 to be an authorized application to receive the copied content. In contrast, the other applications shown were not selected to be an authorized application.

Figure 11:
FIG. 11 shows an example graphic user interface for pasting content.

FIG. 11 shows an example graphic user interface 1100 for pasting the content. As shown in FIG. 11, a user executes a pasting function to paste the username in app10. Because app10 was selected to be an authorized application, app10 receives the copied content and pastes the content in app10.

Figure 12:
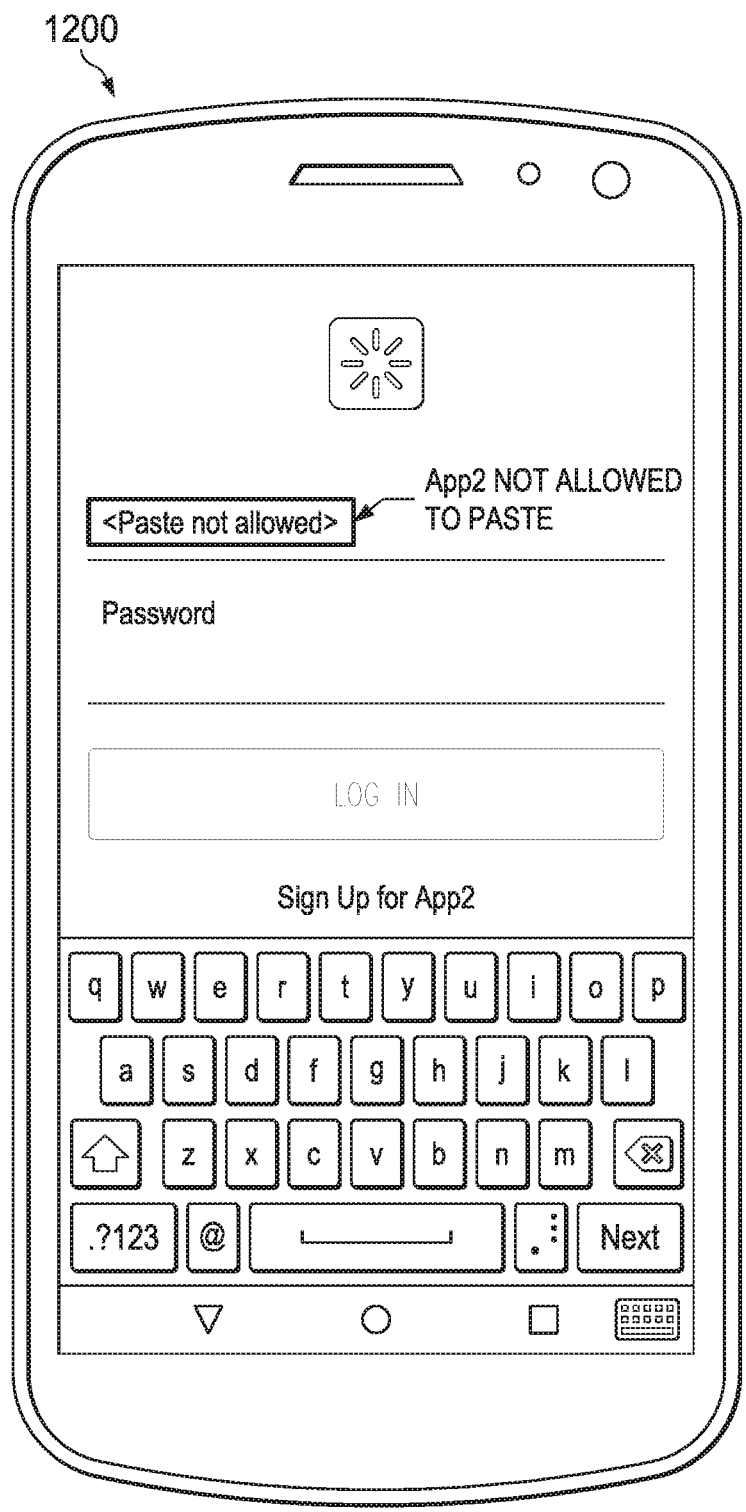
FIG. 12 shows an example graphic user interface for rejecting a pasting operation.

FIG. 12 shows an example graphic user interface 1200 for rejecting the pasting operation. As shown in FIG. 12, a user executes a pasting function to paste the username in app2. Because app2 was not an authorized application, app2 fails to receive the copied content. In some cases, when a pasting command is rejected, no content is outputted on the screen. Alternatively or additionally, a notification can be outputted in the graphic user interface 1200 to indicate that the pasting function is not allowed.

Figure 13:
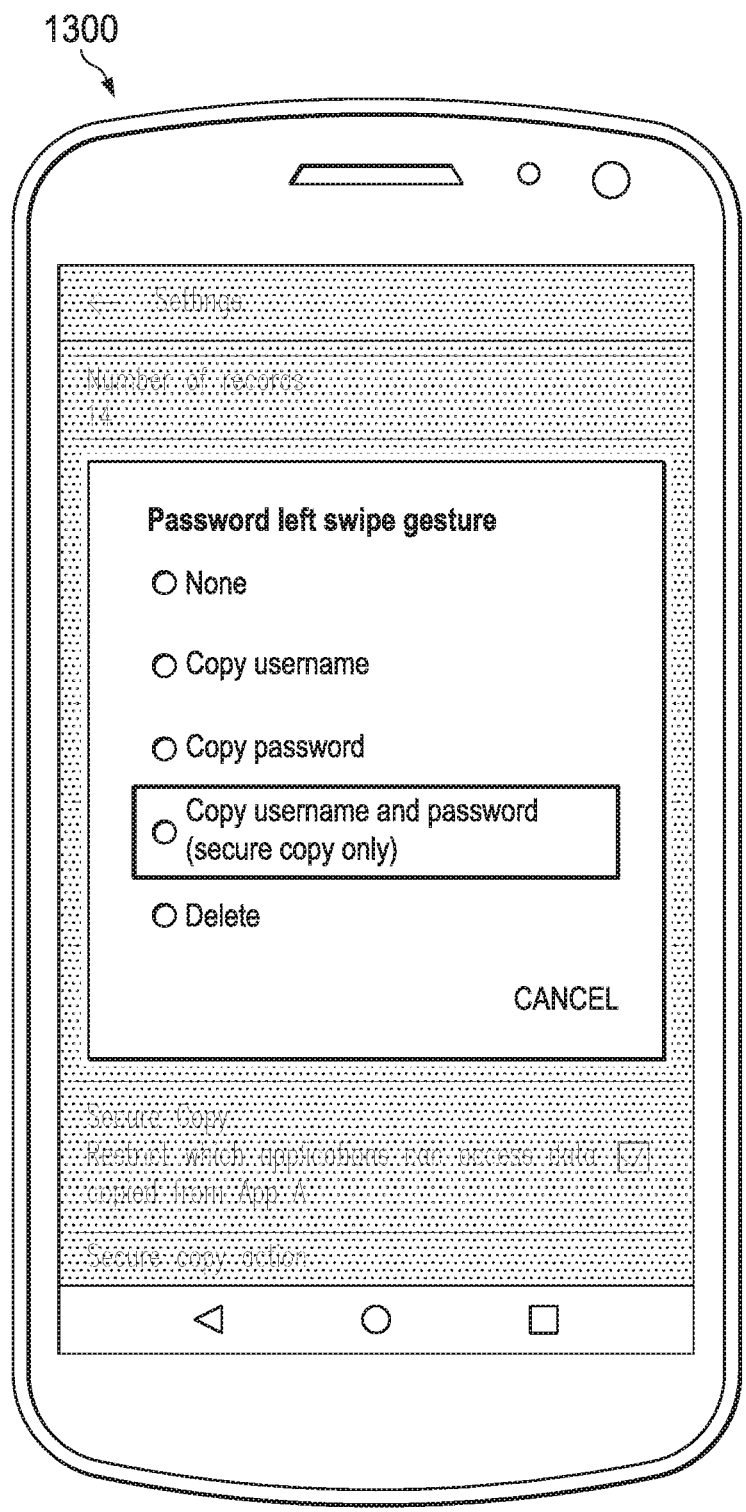
FIG. 13 shows an example graphic user interface for configuring a user gesture.
Figure 14:
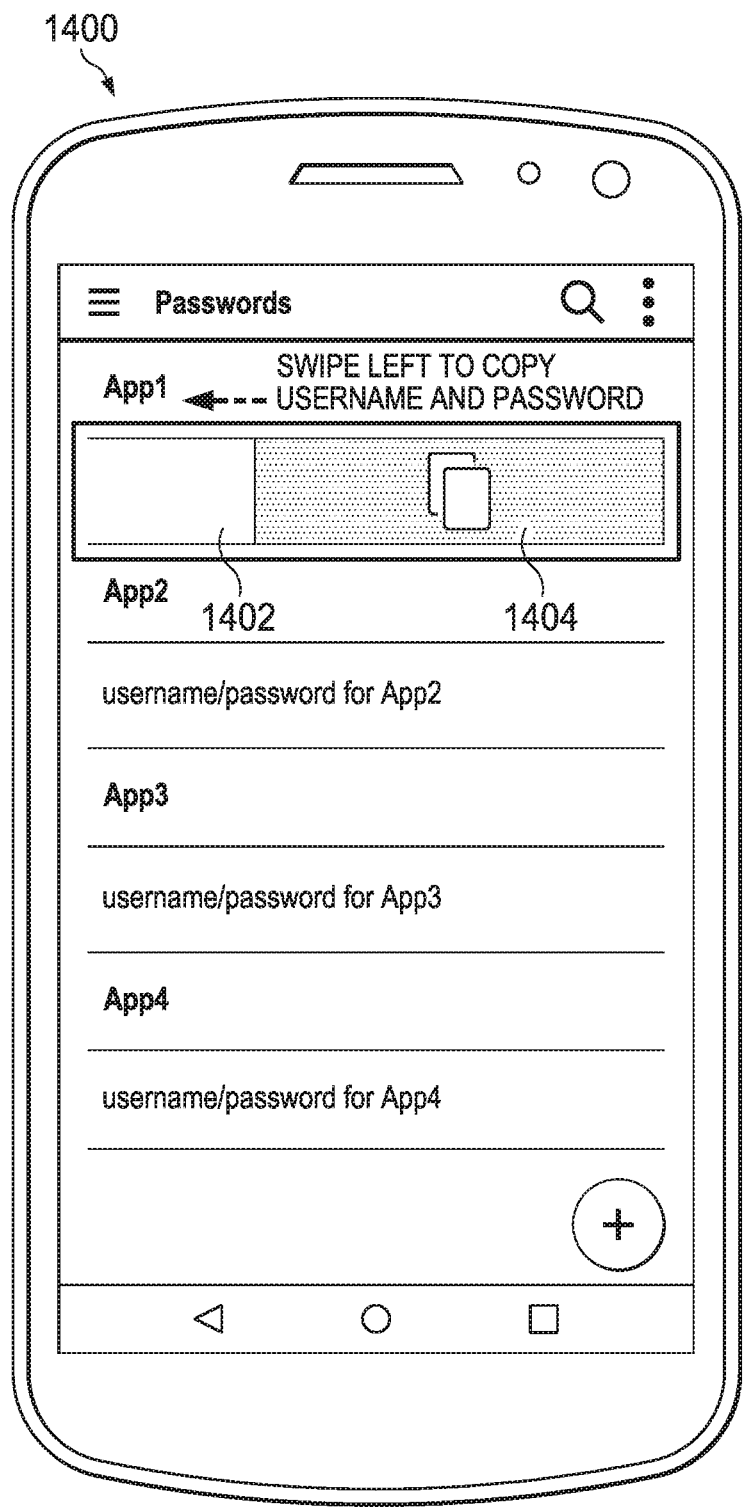
FIG. 14 shows an example graphic user interface for executing a copying function using a configured user gesture.
Figure 15:
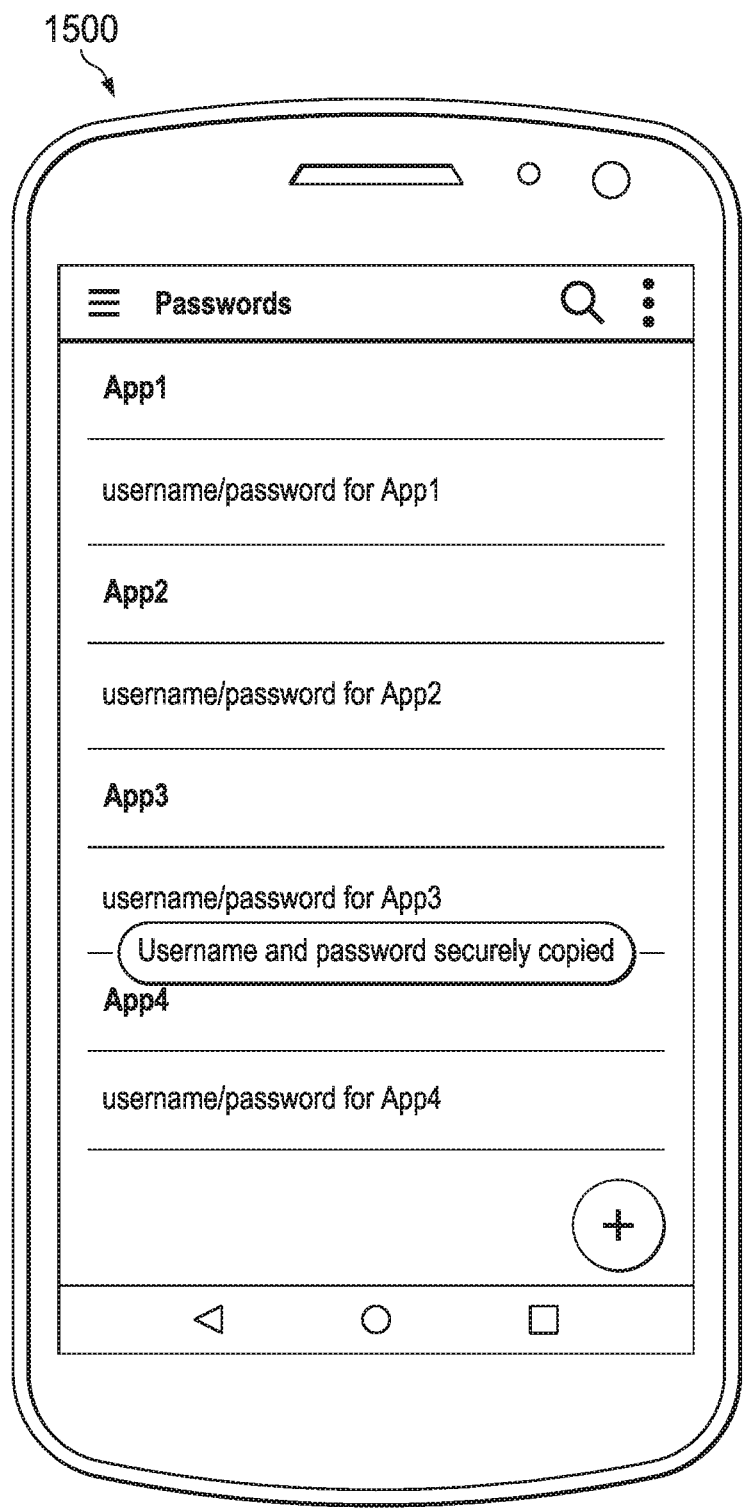
FIG. 15 shows an example graphic user interface for confirming a secure copy operation.

In some cases, different user inputs can be configured to be associated with different copying functions. For example, a particular gesture can be configured to associate with the "secure copy" described previously. FIG. 13 shows an example graphic user interface 1300 for configuring a user gesture. As shown in FIG. 13, a left swipe gesture is configured to associate with copying username and password with the "secure copy" feature. The user or administrator can configure other gestures, e.g., left click, right click, right swipe, or any other gestures, keyboard shortcuts, voice commands, or other commands, for the "secure copy" feature. FIG. 14 shows an example graphic user interface 1400 for executing a copying function using the configured user gesture. As shown in FIG. 14, a user can execute a left swipe to copy the username and password. FIG. 15 shows an example graphic user interface 1500 for confirming the secure copy operation. As shown in FIG. 15, in some cases, a user interface object can be outputted. The user interface object can indicate that the username and password are securely copied.

In some cases, both the username and password can be cut or copied in one gesture or command. For example, a user can swipe the username and password in one gesture. In this example, both the username and the password are included in the copied content. A user can execute two pasting functions to paste the username and password separately. FIG. 16 shows an example graphic user interface 1600 for pasting the username and password. As shown in FIG. 15, a user executes a first paste function in username field of the recipient application, a first request is sent from the recipient application to the provider application. The provider application can provide the username, e.g., through a cursor object pointing to the username, to the recipient application. The user then executes a second paste function in the password field of the recipient application, and a second request is sent from the recipient application to the provider application. The provider application keeps track the number of requests sent from the recipient application. In response to receiving the second request, the provider application can provide the password, e.g., through a cursor object pointing to the password, to the recipient application. The approach improves the copying and pasting functions for username and password.

In some cases, the provider application also keeps track of the time that a paste request is received. If the time elapsed between the first paste request and the second paste request exceeds a threshold, the provider application can determine that the second request is not associated with the first request, and therefore can treat the second request as a request for the username.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices). In some cases, the computer storage medium can be transitory, non-transitory, or a combination thereof.

The term "processor" or "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative, or procedural languages. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory, or both. A computer can include a processor that performs actions in accordance with instructions, and one or more memory devices that store the instructions and data. A computer may also include, or be operatively coupled to receive data from or transfer data to, or both, one or more mass storage devices for storing data, e.g., magnetic disks, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments, separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementation described above should not be understood as requiring such separation in all implementations, and it should be understood that the described program components and systems can generally be integrated together in a single software product or packaged into multiple software products.

Also, techniques, systems, subsystems, and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

While the above detailed description has shown, described, and pointed out the fundamental novel features of the disclosure, as applied to various implementations, it will be understood that various omissions, substitutions, and changes in the form and details of the system illustrated may be made by those skilled in the art, without departing from the intent of the disclosure. In addition, the order of method steps are not implied by the order in which they appear in the claims.

What is claimed is:

1. A method, comprising:
    receiving, at a first application on an electronic device, a first user input for copying content;
    in response to receiving the first user input for copying the content, generating, by the first application, a token, wherein the token comprises an identity number that identifies a type of the content;
    sending the token from the first application to a clipboard application;
    receiving, at a second application on the electronic device, a second user input for pasting the content;
    receiving, at the second application, the token from the clipboard application;
    receiving, at the first application, a request for the content from the second application, wherein the request includes the token;
    determining, at the first application, whether the second application is authorized to receive the content, wherein the token is associated with one or more applications that are authorized to receive the content, and determining whether the second application is authorized to receive the content comprises:
        determining whether the second application is included in the one or more applications associated with the token; and
        determining whether a number of requests for the content is below a threshold; and
    in response to determining that the second application is authorized to receive the content, providing the content to the second application.

2. The method of claim 1, wherein the token included in the request for the content is signed with a private key of the second application, and the content is provided in response to authenticating the second application based on the signed token and a public key of the second application.

3. The method of claim 1, wherein the token sent from the first application to the clipboard application is included in a Uniform Resource Identifier (URI).

4. The method of claim 1, wherein the content that is provided to the second application is encrypted with a public key of the second application.

5. The method of claim 1, wherein a first portion of the content is provided in response to a first request for the content from the second application and a second portion of the content is provided in response to a second request for the content from the second application, and the second portion of the content is different than the first portion of the content.

6. The method of claim 1, wherein the content is provided to the second application using a cursor object.

7. The method of claim 1, further comprising:
    in response to determining that the second application is not authorized to receive the content, preventing the content from being provided to the second application.

8. An electronic device, comprising:
    a memory; and
    at least one hardware processor communicatively coupled with the memory and configured to:
        receive, at a first application on the electronic device, a first user input for copying content;
        in response to receiving the first user input for copying the content, generate, by the first application, a token, wherein the token comprises an identity number that identifies a type of the content;
        send the token from the first application to a clipboard application;
        receive, at a second application on the electronic device, a second user input for pasting the content;
        receive, at the second application, the token from the clipboard application;
        receive, at the first application, a request for the content from the second application, wherein the request includes the token;
        determine, at the first application, whether the second application is authorized to receive the content, wherein the token is associated with one or more applications that are authorized to receive the content, and determining whether the second application is authorized to receive the content comprises:
            determining whether the second application is included in the one or more applications associated with the token; and
            determining whether a number of requests for the content is below a threshold; and
        in response to a determination that the second application is authorized to receive the content, provide the content to the second application.

9. The electronic device of claim 8, wherein the token included in the request for the content is signed with a private key of the second application, and the content is provided in response to authenticating the second application based on the signed token and a public key of the second application.

10. The electronic device of claim 8, wherein the token sent from the first application to the clipboard application is included in a Uniform Resource Identifier (URI).

11. The electronic device of claim 8, wherein the content that is provided to the second application is encrypted with a public key of the second application.

12. The electronic device of claim 8, wherein a first portion of the content is provided in response to a first request for the content from the second application and a second portion of the content is provided in response to a second request for the content from the second application, and the second portion of the content is different than the first portion of the content.

13. A non-transitory computer-readable medium containing instructions which, when executed, cause a computing device to perform operations comprising:
receiving, at a first application on the computing device, a first user input for copying content;
in response to receiving the first user input for copying the content, generating, by the first application, a token, wherein the token comprises an identity number that identifies a type of the content;
sending the token from the first application to a clipboard application;
receiving, at a second application on the computing device, a second user input for pasting the content;
receiving, at the second application, the token from the clipboard application;
receiving, at the first application, a request for the content from the second application, wherein the request includes the token;
determining, at the first application, whether the second application is authorized to receive the content, wherein the token is associated with one or more applications that are authorized to receive the content, and determining whether the second application is authorized to receive the content comprises
determining whether the second application is included in the one or more applications associated with the token; and
determining whether a number of requests for the content is below a threshold; and
in response to determining that the second application is authorized to receive the content, providing the content to the second application.

14. The non-transitory computer-readable medium of claim 13, wherein the token included in the request for the content is signed with a private key of the second application, and the content is provided in response to authenticating the second application based on the signed token and a public key of the second application.

15. The non-transitory computer-readable medium of claim 13, wherein the token sent from the first application to the clipboard application is included in a Uniform Resource Identifier (URI).

16. The non-transitory computer-readable medium of claim 13, wherein the content that is provided to the second application is encrypted with a public key of the second application.

17. The non-transitory computer-readable medium of claim 13, wherein a first portion of the content is provided in response to a first request for the content from the second application and a second portion of the content is provided in response to a second request for the content from the second application, and the second portion of the content is different than the first portion of the content.

* * * * *